(12) United States Patent
Lawrence

(10) Patent No.: US 12,257,956 B2
(45) Date of Patent: Mar. 25, 2025

(54) MOUNTING SYSTEM FOR A SIDEVIEW CAMERA OF A VEHICLE

(71) Applicant: AAMP of Florida, Inc., Clearwater, FL (US)

(72) Inventor: Jon Lawrence, Clearwater, FL (US)

(73) Assignee: AAMP of Florida, Inc., Clearwater, FL (US)

( * ) Notice: Subject to any disclaimer, the term of this patent is extended or adjusted under 35 U.S.C. 154(b) by 369 days.

(21) Appl. No.: 17/958,695

(22) Filed: Oct. 3, 2022

(65) Prior Publication Data

US 2023/0104179 A1     Apr. 6, 2023

Related U.S. Application Data

(60) Provisional application No. 63/252,729, filed on Oct. 6, 2021.

(51) Int. Cl.
*B60R 11/04* (2006.01)
*B60R 11/00* (2006.01)

(52) U.S. Cl.
CPC ......... *B60R 11/04* (2013.01); *B60R 2011/004* (2013.01)

(58) Field of Classification Search
CPC ............... B60R 11/04; B60R 2011/004; B60R 11/0217; B60R 2011/0064; B60R 2011/0085; H04N 23/54; H04N 7/181; H04N 23/45; H04N 23/51; H04N 7/183; H04N 23/50; H04N 23/57; G01S 19/49; G03B 17/561; G08G 1/166; G08G 1/04; G08B 21/06
See application file for complete search history.

(56) References Cited

U.S. PATENT DOCUMENTS

| | | | |
|---|---|---|---|
| 10,710,499 B1* | 7/2020 | Ammar | F21V 15/01 |
| 2018/0345917 A1* | 12/2018 | Yamamoto | B60R 11/04 |
| 2020/0262361 A1* | 8/2020 | Ueta | B60R 11/04 |
| 2022/0097622 A1* | 3/2022 | Hart | B60R 11/04 |

\* cited by examiner

*Primary Examiner* — Alazar Tilahun
(74) *Attorney, Agent, or Firm* — Michael Best & Friedrich LLP

(57) ABSTRACT

A mounting bracket is configured to mount a sideview camera to a vehicle and includes a first portion coupled to the sideview camera, a second portion extending from the first portion at a first nonzero angle, a third portion extending from the second portion at a second nonzero angle, and fourth portion extending from the third portion at a third nonzero angle. The fourth portion has an opening configured to receive a bolt of the vehicle. The mounting bracket also includes a slot extending through the first portion, the second portion, and the third portion. The slot is configured to receive a cable of the sideview camera.

25 Claims, 10 Drawing Sheets

MOUNTING SYSTEM FOR A SIDEVIEW CAMERA OF A VEHICLE

CROSS REFERENCE

This application claims priority to prior-filed, U.S. Provisional Patent Application No. 63/252,729 filed on Oct. 6, 2021, the entire contents of which is incorporated herein by reference.

FIELD OF THE INVENTION

The present invention relates to systems and methods for mounting a camera to a vehicle.

BACKGROUND OF THE INVENTION

Various cameras, such as rearview cameras and sideview cameras, are often equipped on newer vehicles as original manufacture equipment parts. However, at times it is desirable to add a camera to a vehicle as an aftermarket part or to replace an existing camera that may no longer be functional. Cameras, such as sideview cameras, may be used on a vehicle to allow a driver of the vehicle to view blind spots without turning their head. Sideview cameras may be mounted to the vehicle via various methods. However, the methods that are currently implemented tend to cause the camera to be loosely coupled to the vehicle or can cause permanent damage to the vehicle.

SUMMARY OF THE INVENTION

In one embodiment, the invention provides a method of mounting a sideview camera to a vehicle including providing a mounting bracket. The mounting bracket includes a first portion configured to be coupled to the sideview camera, a second portion extending from the first portion at a first nonzero angle and converging with the first portion at a first corner, a slot extending through the first corner, the slot being configured to receive a cable of the sideview camera, and an opening configured to receive a bolt. The method further includes removing a bolt from an opening on a body panel of the vehicle, routing a cable of the camera through the slot extending through the first portion and the second portion of the mounting bracket, aligning the first portion of the mounting bracket with an outer surface of the body panel, aligning the second portion of the mounting bracket with an inner surface of the body panel, inserting the bolt through the opening in the mounting bracket and the opening on the body panel, and tightening the bolt to couple the on the mounting bracket to the vehicle.

In another embodiment, the invention provides a system including a sideview camera having a power and data cable and a mounting bracket. The mounting bracket includes a first portion coupled to the sideview camera, a second portion extending from the first portion at a first nonzero angle, a third portion extending from the second portion at a second nonzero angle, a fourth portion extending from the third portion at a third nonzero angle, and a slot. The fourth portion has an opening configured to receive a bolt. The slot extends through at least partly through the first portion, the second portion, and the third portion. The slot receives the power and data cable of the sideview camera.

In another embodiment, the invention provides a mounting bracket configured to mount a sideview camera to a vehicle. The mounting bracket includes a first portion coupled to the sideview camera, a second portion extending from the first portion at a first nonzero angle and converging with the first portion at a first corner, a third portion extending from the second portion at a second nonzero angle and converging with the second portion at a second corner, and a fourth portion extending from the third portion at a third nonzero angle and converging with the third portion at a third corner. The fourth portion having an opening configured to receive a bolt.

In yet another embodiment, the invention provides a mounting bracket configured to mount a sideview camera to a vehicle. The mounting bracket includes a first portion configured to be coupled to the sideview camera, a second portion, and a third portion extending from the second portion at a first nonzero angle and converging with the second portion at a first corner. The first portion has a first opening configured to receive a fastener. The second portion has a second opening configured to receive a fastener. The third portion has a third opening configured to receive a bolt. The second portion is parallel to the first portion. The first opening is aligned with the second opening.

Other aspects of the invention will become apparent by consideration of the detailed description and the accompanying drawings.

DETAILED DESCRIPTION

Figure 1:
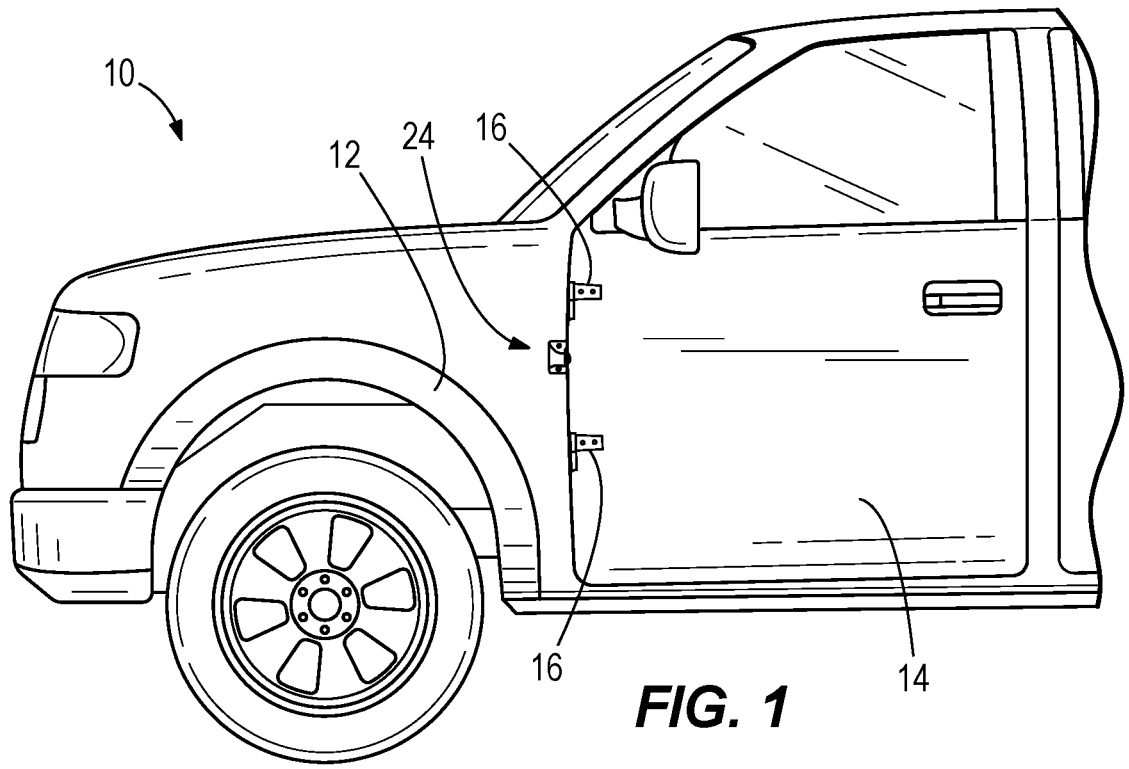
FIG. 1 is a perspective view of a vehicle, a mounting bracket, and a sideview camera according to one embodiment.
Figure 2:
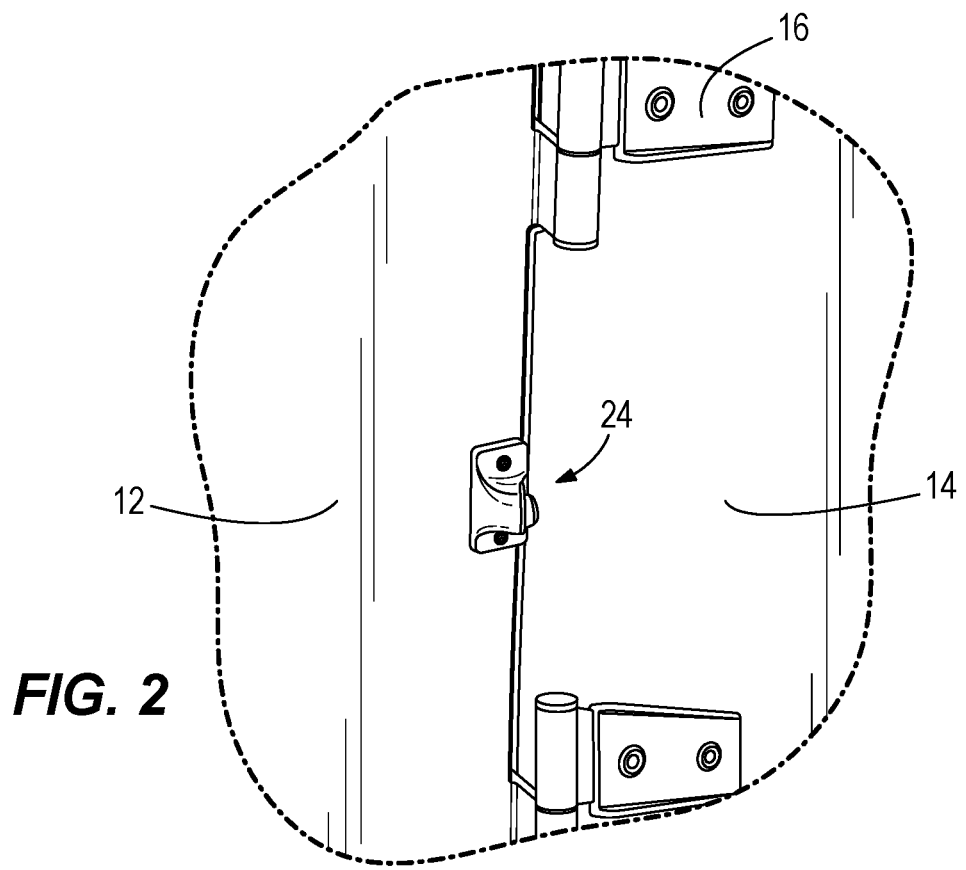
FIG. 2 is an enlarged perspective view of the vehicle, the mounting bracket, and the sideview camera of FIG. 1.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

Cameras may sometimes be added to a vehicle as an aftermarket part to add additional functionality to the vehicle. As opposed to an original equipment manufacture (OEM) camera, aftermarket cameras are not equipped on the vehicle at the time of manufacture. Therefore, in order to add an aftermarket camera to a vehicle, additional challenges may be faced, such as where and how to mount the camera to the vehicle in a location that is secure and does not do much damage to the vehicle. In some instances, cameras may be mounted to the vehicle via double-sided adhesive tape, via a molded plastic housing on a side mirror of the vehicle, or via fasteners directly screwed through the exterior of the vehicle. These methods cause the camera to be loosely coupled to the vehicle or cause permanent damage to the vehicle. Additionally, if a molded plastic housing is used to support a camera on a side mirror, then the camera is not be operable when the door of the vehicle is removed (for example, on a Jeep Wrangler). Rather, when the door is removed for use of the vehicle without the door, the mirror and camera will also be removed. Furthermore, another issue that arises when installing an aftermarket camera to a vehicle is the difficulty of wiring the camera to the vehicle.

The present disclosure resolves some of the downfalls associated with the existing methods of installing an aftermarket camera on a vehicle. Provided herein is a simplistic method of securing a camera to a vehicle so that the camera is stable and, in some embodiments, the installation of the camera does not cause damage to the vehicle. Additionally, the present disclosure allows for the camera to be maintained on the vehicle when the doors of the vehicle are removed. Finally, the present disclosure enables the camera to be easily wired to the vehicle.

With reference to FIGS. 1-4, a motorized vehicle 10 includes a body panel 12 and a door 14 adjacent the body panel 12. In the illustrated embodiment, the vehicle 10 is an automobile. The vehicle 10 also includes a second panel and a second door on an opposite side of the vehicle 10. The second panel and the second door are substantially similar to the body panel 12 and the door 14. For sake of brevity, only one half of the vehicle 10 is described.

The door 14 is pivotable with respect to the body panel 12 and can pivot between an open position and a closed position. The body panel 12 includes an outer surface 21 facing an exterior of the vehicle 10 and an inner surface 22 facing the door 14 and facing an interior of the vehicle 10. For example, the outer surface 21 may include a front quarter panel or a rear quarter panel, and the inner surface 22 may include a door jam. The outer surface 21 and the inner surface 22 meet to form an edge #2 (or a corner) of the body panel 12. The inner surface 22 of the body panel 12 extends along a corresponding inner surface #1 of the door 14 when the door is in a closed position. The door 14 is coupled to the body panel 12 via a plurality of hinges 16. In some embodiments, the hinges 16 are coupled to the inner surface 22 of the body panel 12 and the inner surface #1 of the door 14 to allow the door 14 to pivot relative to the body panel 12. In some embodiments, the door 14 may be removable from the vehicle 10. When the door 14 is mounted on the vehicle 10, the door 14 and the body panel 12 define a gap 18.

A camera system 24 may be mounted to the vehicle 10 via a bolt 20. In some embodiments, the bolt 20 is an existing bolt provided with the vehicle 110. For example, the bolt 20 may be a door jam bolt 20 and is coupled to the inner surface 22 of the body panel between the hinges 16. In other embodiments, the bolt 20 may be an additional bolt 20 that is added to the vehicle as an aftermarket part. The camera system 24 includes a mounting bracket 28 and a camera 32. In the illustrated embodiment, the camera 32 is a sideview driver awareness camera. In other words, the camera 32 is a blind spot camera or other functional camera. In the illustrated embodiment, the camera 32 is coupled to the mounting bracket 28 via a plurality of fasteners 36. In the illustrated embodiment, the fasteners 36 are screws. In other embodiments, the fasteners 36 may be replaced with an adhesive. The camera 32 includes a power and data cable 37 for transmitting and/or receiving data between the camera 32 and the vehicle 10. The power and data cable 37 is configured to supply the camera 32 with power.

In the illustrated embodiment, the mounting bracket 28 is formed from stamped sheet metal. Specifically, the mounting bracket 28 is formed from cold-rolled steel. In other embodiments, the mounting bracket 28 can be formed from other materials such as aluminum. In some embodiments, the mounting bracket 28 can have no finish. In some embodiments, the mounting bracket 28 is coated with a rubberized coating.

Figure 4:
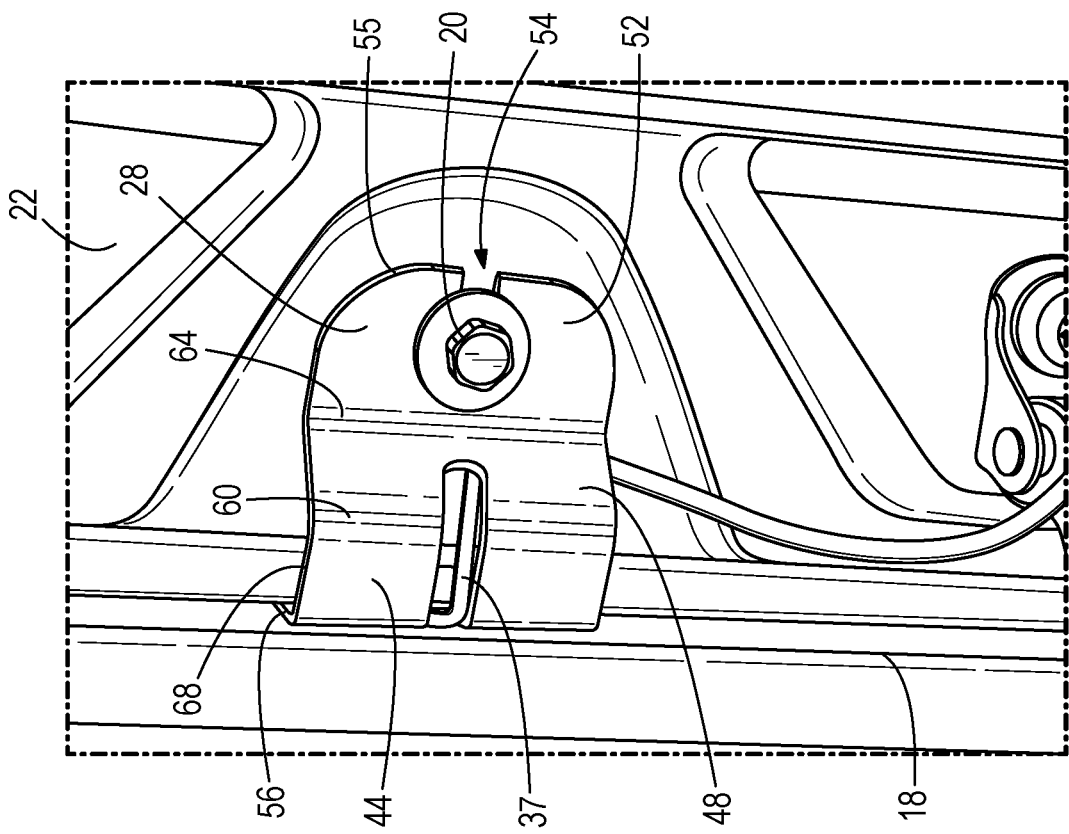
FIG. 4 is another enlarged perspective view of the vehicle and the mounting bracket of FIG. 1 from the interior of the vehicle.
Figure 3:
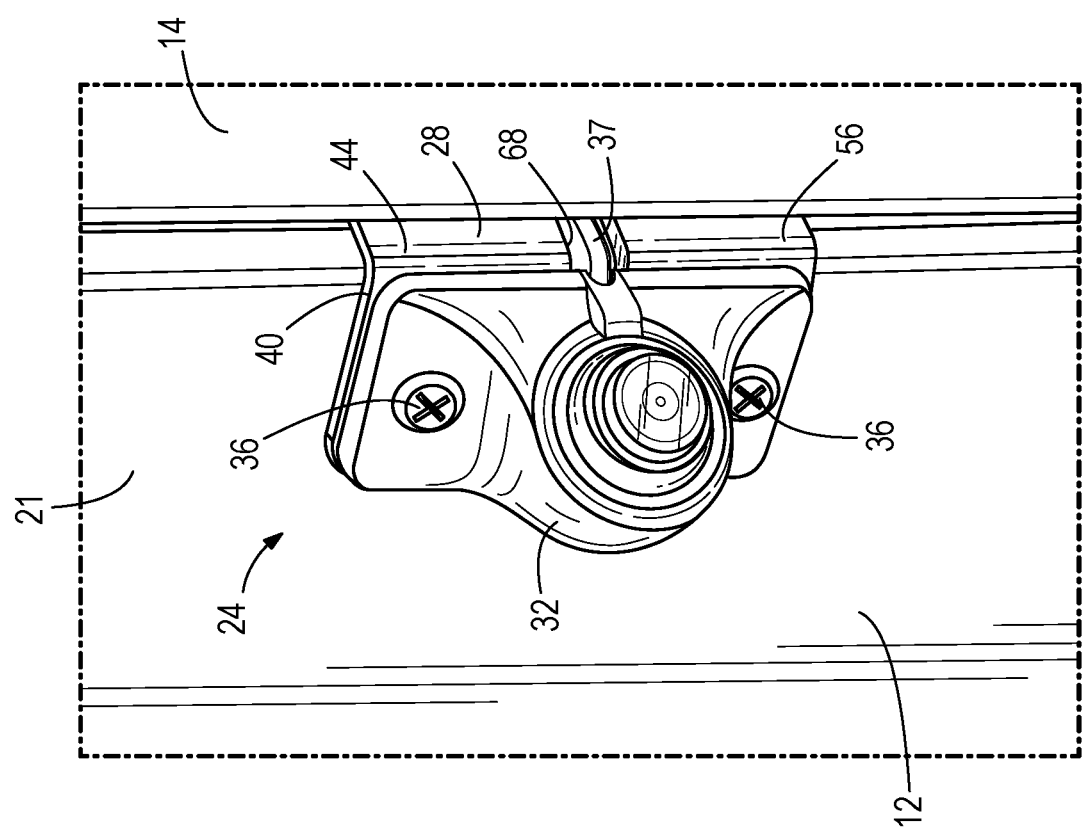
FIG. 3 is another enlarged perspective view of the vehicle, the mounting bracket, and the sideview camera of FIG. 1.
Figure 6:
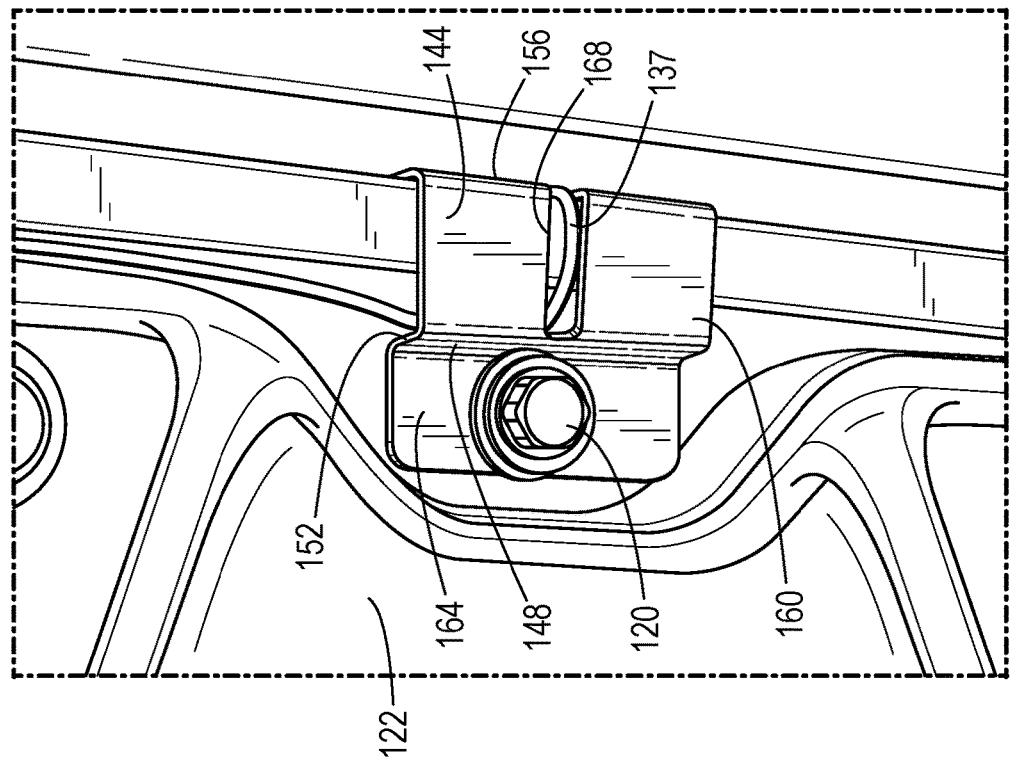
FIG. 6 is an enlarged perspective view of the vehicle, the mounting bracket, and the sideview camera of FIG. 5.
Figure 5:
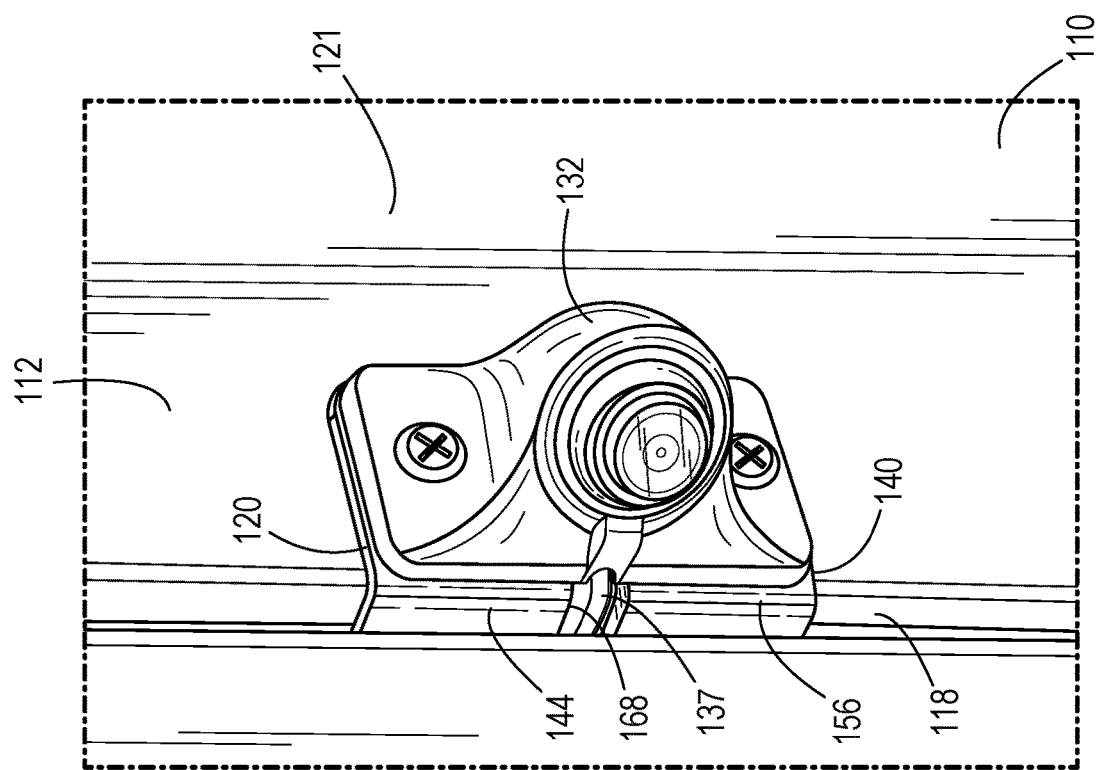
FIG. 5 is an enlarged perspective view of a vehicle, a mounting bracket, and a sideview camera according to another embodiment.
Figure 7:
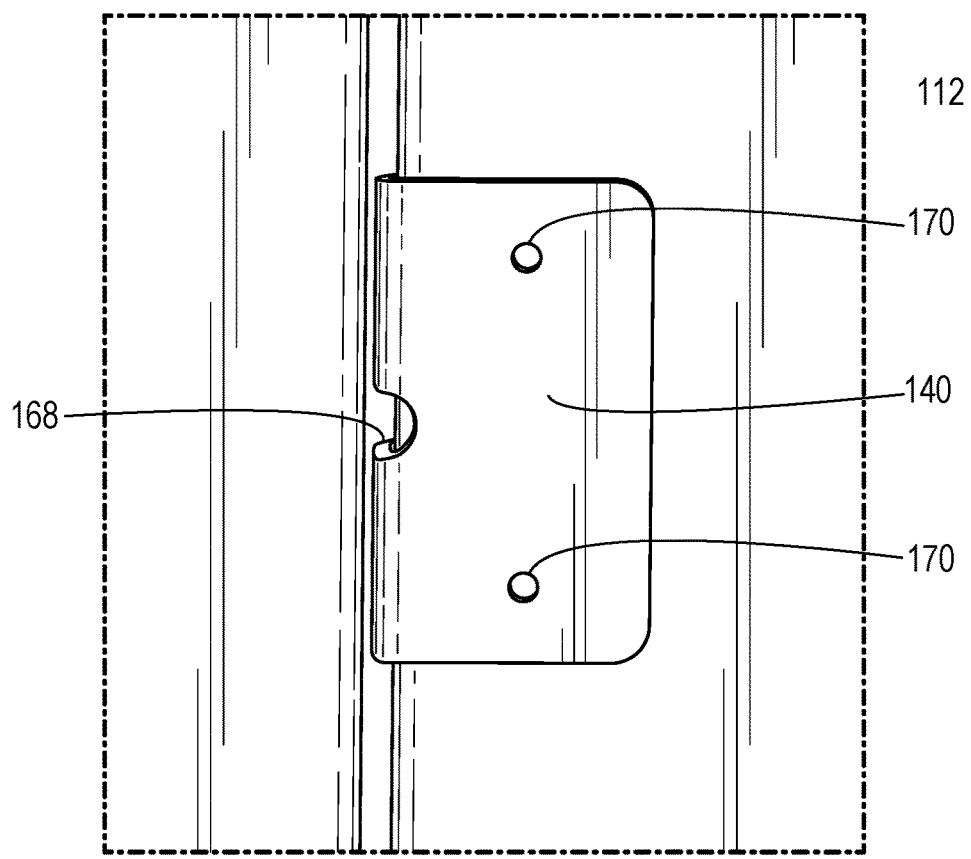
FIG. 7 is an enlarged perspective view of the vehicle and the mounting bracket of FIG. 5 with the sideview camera removed.

Referring to FIGS. 3 and 4, the mounting bracket 28 includes a first portion 40, a second portion 44 adjacent the first portion 40, a third portion 48 adjacent the second portion 44 and opposite the first portion 40, and a fourth portion 52 adjacent the second portion 44 and opposite the first portion 40. In the illustrated embodiment, the portions 40, 44, 48, 52 are continuous and are formed as one-piece. In other embodiments, the portions 40, 44, 48, and 52 may be separate pieces which are coupled together or molded together after being formed.

The first portion 40 is planar and has a generally rectangular shape. The first portion 40 is arranged adjacent the outer surface 21 of the body panel 12. The first portion 40 supports the camera 32 adjacent the outer surface 21 of the body panel 112. The second portion 44 extends at a nonzero angle from the first portion 40. The first portion 40 and the second portion 44 converge at a first corner 56 that aligns with the edge #2 of the body panel. The second portion 44 may extend at about a 90 degree angle relative to the first portion 40. For example, in some embodiments, the second portion 44 may extend from the first portion 40 at an angle between 70 and 110 degrees. In some embodiments, the second portion 44 may extend from the first portion 40 at an angle between 80 and 100 degrees. The second portion 44 extends through the gap 18 when the mounting bracket 28 is secured to the vehicle 10. The second portion 44 is arranged adjacent the inner surface 22 of the body panel 12.

The third portion 48 has a generally rectangular shape and extends at a nonzero angle from the second portion 44 and is arranged adjacent the inner surface 22 of the body panel 12. The third portion 48 and the second portion 44 converge at a second corner 60. The third portion 48 may extend at about a 90 degree angle relative to the second portion 44. For example, in some embodiments, the third portion 48 may extend from the second portion 44 at an angle between 70 and 110 degrees. In some embodiments, the third portion 48 may extend from the second portion 44 at an angle between 80 and 100 degrees. In the illustrated embodiment, the third portion 48 is oriented to face the first portion 40. In other words, the third portion 48 extends generally along the same direction as the first portion 40, and in some instances, may be parallel to the first portion 40. Thus, together the first portion 40, the second portion 44, and the third portion 48 form a U-shape. However, in the illustrated embodiment, a length of the third portion 48 is less than a length of the first portion 40.

The fourth portion 52 extends at a nonzero angle from the third portion 48 and converges with the third portion 48 at a third corner 64. In some embodiments, the fourth portion 52 extends at about a 90 degree angle from the third portion 48. For example, in some embodiments, the fourth portion 52 may extend from the third portion 48 at an angle between 70 and 110 degrees. In some embodiments, the fourth portion 52 may extend from the third portion 48 at an angle between 80 and 100 degrees. The fourth portion 52 extends generally along the same direction as the second portion 44, and in some instances, may be parallel to the first portion. Together the third portion 48 and the fourth portion 52 form an L-shape. In some embodiments, the mounting bracket 28 does not include a third portion 48. Rather, the second portion 44 and the fourth portion 52 are formed as a continuous piece without the third portion 48 in between.

The fourth portion 52 is arranged adjacent the inner surface 22 of the body panel 12. In the illustrated embodiment, the fourth portion 52 is semi-circular in shape. However, in other embodiments, the fourth portion 52 may have a rectangular or other shape. The fourth portion 52 has an opening 54 for receiving the bolt 20. In some embodiments, the opening 54 extends to a distal end 55 of the fourth portion 52. The bolt 20 can inserted into the opening 54 and be tightened against the fourth portion 52 to secure the mounting bracket 28 to the vehicle 10. When the mounting bracket 28 is coupled to the vehicle, the mounting bracket 28 is arranged so that the bolt 20 extends through the opening 54 and into the inner surface 22 of the body panel 12.

The mounting bracket 28 may include an elongated slot 68 for receiving the cable 37 of the camera 32. In the illustrated embodiment, the elongated slot 68 extends through at least a portion of the first portion 40, the second portion 44, the third portion 48, and the fourth portion 52. Additionally, in the illustrated embodiment, the elongated slot 68 extends through the first corner 56, the second corner 60, and the third corner 64. When the camera 32 is mounted on the mounting bracket 28, the cable 37 is fed through the slot 68 in order to prevent the cable 37 from being pinched when the door 14 is moved between the open and the closed position.

The camera system 24 is configured such that the mounting bracket 28 and the camera 32 can be attached to and/or removed from the vehicle 10 without causing damage or deformation (e.g., adding holes through the body panel 12, leaving behind a residue, denting the body, removing paint, etc.) to the body of the vehicle 10. The body of the vehicle 10 is in the same physical condition before the camera system 24 is mounted to the vehicle 10, after the camera system is mounted to the vehicle 10, and after the camera system is demounted from the vehicle 10.

FIGS. 5-14 illustrate another embodiment of a camera system 124 having a mounting bracket 128 for a camera 132 and a body panel 112 of a vehicle 110. The mounting bracket 128, the camera 132, and the body panel 112 are substantially the same as the mounting bracket 28, the camera 32, and the body panel 112 of the first embodiment. The body panel 112 includes an outer surface 121 and an inner surface 122 similar to the outer surface 21 and the inner surface 22.

Figure 8:
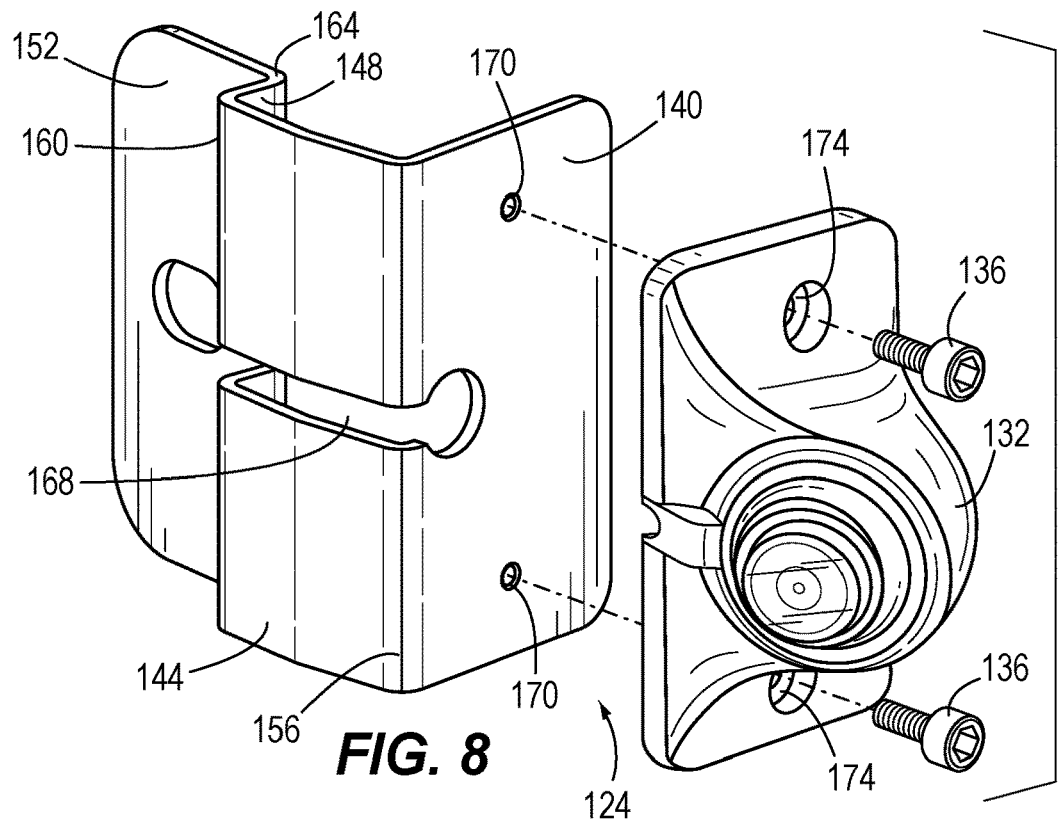
FIG. 8 is an exploded view of the mounting bracket and the sideview camera of FIG. 5.
Figure 9:
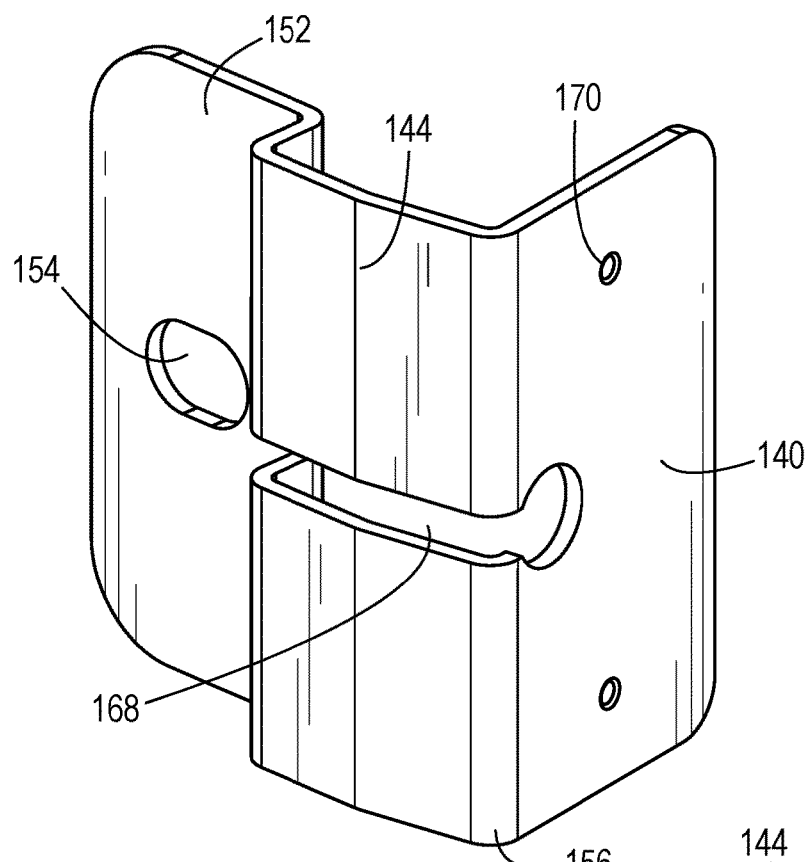
FIG. 9 is a front perspective view of the mounting bracket of FIG. 5.
Figure 10:
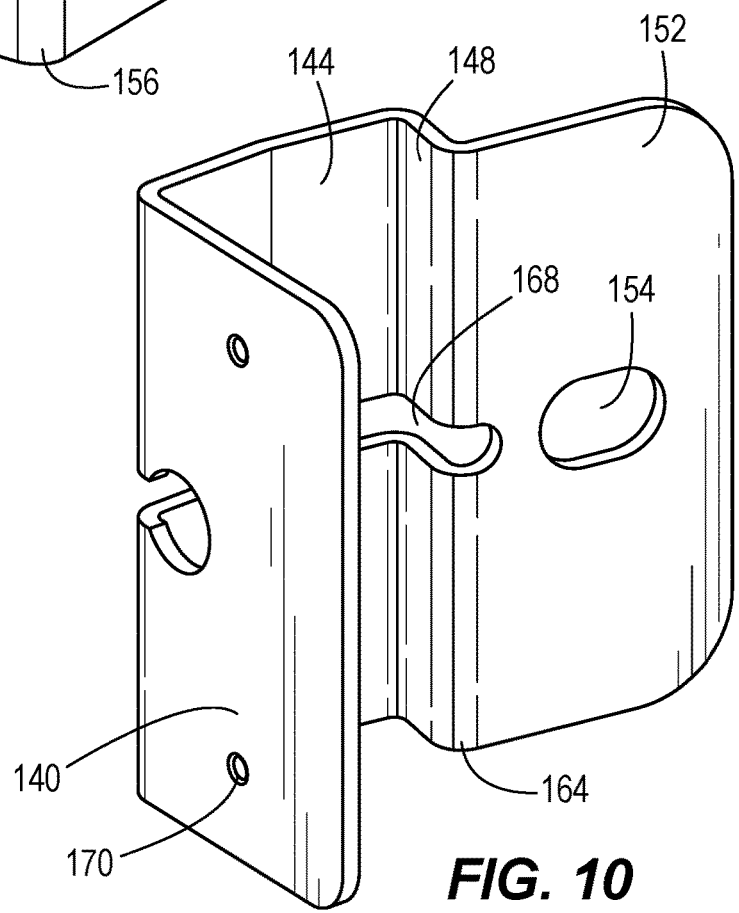
FIG. 10 is a back perspective view of the mounting bracket of FIG. 5.

As illustrated, the mounting bracket 128 has a first portion 140 adjoining a second portion 144 at a first corner 156, a third portion 148 adjoining the second portion 144 at a second corner 160, and a fourth portion 152 adjoining the third portion 148 at a third corner 164. The first portion 140 includes a length that is greater than a length of the third portion 148. The first portion 140 and the fourth portion 152 are substantially rectangular in shape. Referring to FIG. 8, in some embodiments, one or more of the corners (i.e., 156, 160, or 164) may be recessed to reduce the rounded profile of the corner.

The mounting bracket 128 may include an elongated slot 168 extending at least partially through the first portion 140, the second portion 144, the third portion 148, and the fourth portion 152. The elongated slot 168 may also extend through the first corner 156, the second corner 160, and the third corner 164. In the illustrated embodiment, a first end of the slot 168 is arranged in the first portion 140 and a second end of the slot is arranged in the fourth portion 152. Additionally, in some embodiments, the slot 168 may only extend through the first portion 140, the first corner 156, the second portion 144, the second corner 160, and the third portion 148. In some embodiments, the slot 168 may only extend through the first portion 140, the first corner 156, the second portion 144, the second corner 160, the third portion 148, and the third corner 164. The slot 168 is configured to receive a cable 37 of the camera 132 and is configured to guide the cable 37 from an exterior of the vehicle 110 to an interior of the vehicle 110. The cable 37 may be a power cable, a data cable, or both.

Referring back to FIGS. 7-12, the first portion 140 includes a plurality of holes 170. In the illustrated embodiment, the first portion 140 has two holes 170. In some embodiments the first portion 140 may have three or more holes 170. In some embodiments, the first portion 140 may have less than two holes 170. The holes 170 are positioned to be equidistant from the slot 168. Each of the holes 170 may be a threaded through hole. When the camera 132 is mounted to the mounting bracket 128, fasteners 136 are inserted in holes 174 in a housing of the camera 132 and extend into the holes 170 of the mounting bracket 128. The fasteners 136 may be threaded fasteners (e.g., screws) such that the threads of the fasteners 136 engage threads of the holes 170 to secure the camera 132 to the mounting bracket 128. The fasteners 136 may extend in a direction perpendicular to a bolt 120 of the body panel 112.

Figure 11:
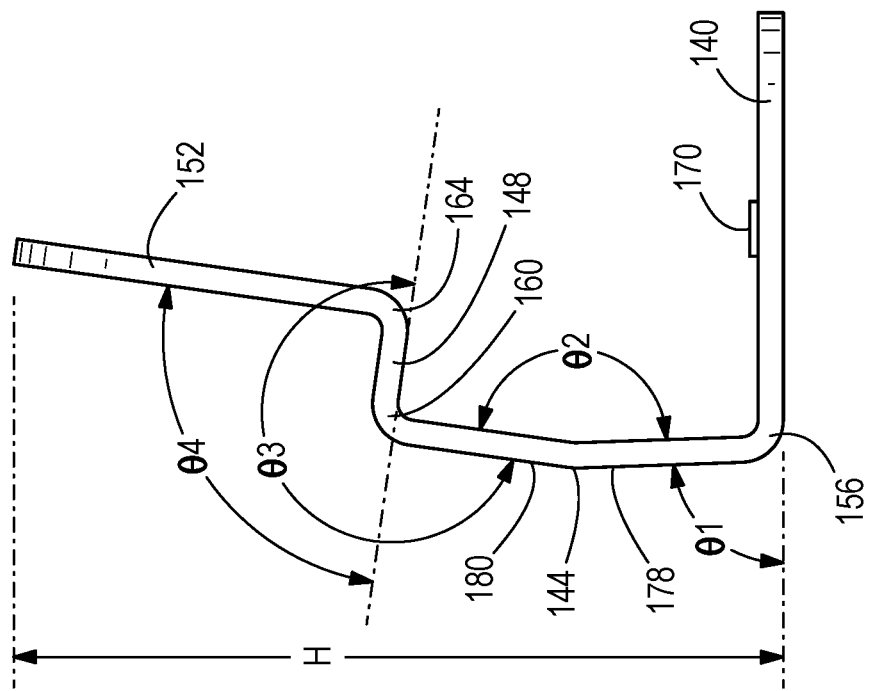
FIG. 11 is a top view of the mounting bracket of FIG. 5.

Referring to FIG. 11, in some embodiments, the second portion 144 may be V-shaped and include a first segment 178 and a second segment 180. The first segment 178 extends from the first portion 140 at an obtuse angle (i.e., when measured from the first portion 140 toward the second portion 144). The first segment 178 forms a first angle $\theta 1$ with a longitudinal direction of the first portion 140, as shown in FIG. 11. In some embodiments, the first angle $\theta 1$ is greater than 60 degrees and less than 90 degrees. In some embodiments, the first angle $\theta 1$ is greater than 80 degrees and less than 90 degrees. In some embodiments, the first angle θ1 is approximately 88 degrees. The first segment 178 and the second segment 180 form a second angle θ2 between each other. The second angle θ2 is an obtuse angle. In some embodiments, the second angle θ2 is less than 205 degrees and more than 125 degrees. In some embodiments, the second angle ∂42 is less than 180 degrees and more than 160 degrees. In some embodiments, the second angle θ2 is approximately 170 degrees.

Further, the third portion 148 extends from the second segment 180 at a nonzero angle. In some embodiments, the third portion 148 is perpendicular to the second segment 180. The third portion 148 and a longitudinal direction of the second segment 180 form a third angle θ3. In some embodiments, the third angle θ3 is less than 300 degrees and greater than 240 degrees. In some embodiments, the third angle θ3 is less than 285 degrees and greater than 255 degrees. In some embodiments, the third angle θ3 is approximately 270 degrees. The fourth portion 152 extends from the third portion 148 at a fourth angle θ4. In some embodiments the fourth angle θ4 is greater than 45 degrees and less than 135 degrees. In some embodiments, the fourth angle θ4 is greater than 60 degrees and less than 120 degrees. In some embodiments, the fourth angle θ4 is approximately 90 degrees such that the fourth portion 152 is perpendicular to the third portion 148.

The fourth portion 152 includes an opening 154. In the illustrated embodiment, the opening 154 is centered on the fourth portion 152 and has a slightly elongated shape. As illustrated, the opening 154 is aligned with the slot 168. The bolt 120 of the body panel 112 is inserted in the opening 154 and is tightened against the fourth portion 152 to secure the mounting bracket 128 to the vehicle 110. When the mounting bracket 128 is coupled to the vehicle, the mounting bracket 128 is arranged such that the bolt 120 extends through the opening 154 and into the inner surface 122 of the body panel 12.

Figure 12:
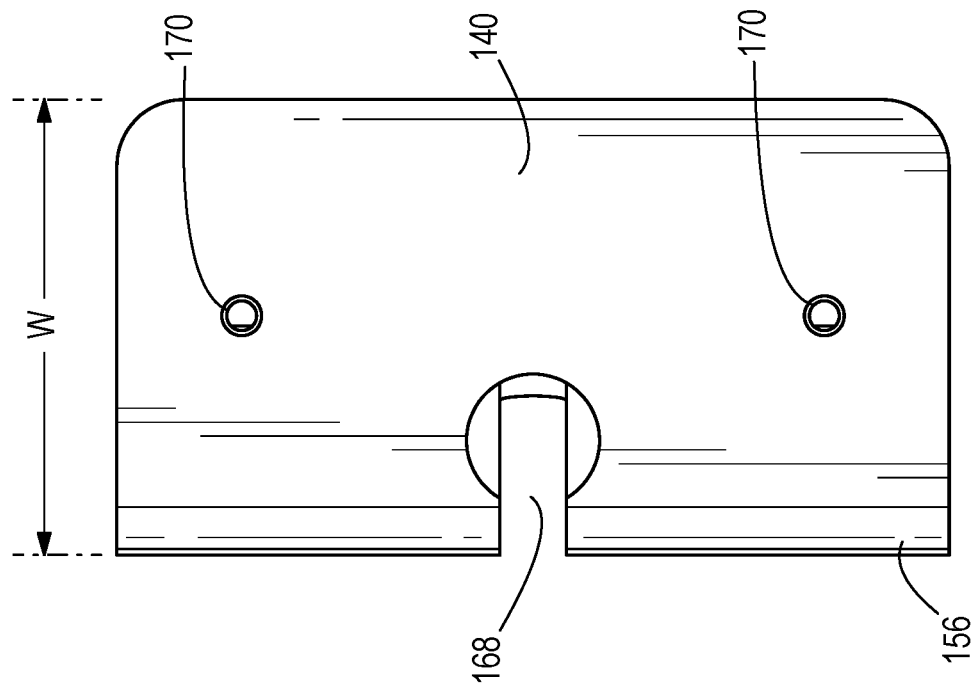
FIG. 12 is a front view of the mounting bracket of FIG. 5.
Figure 13:
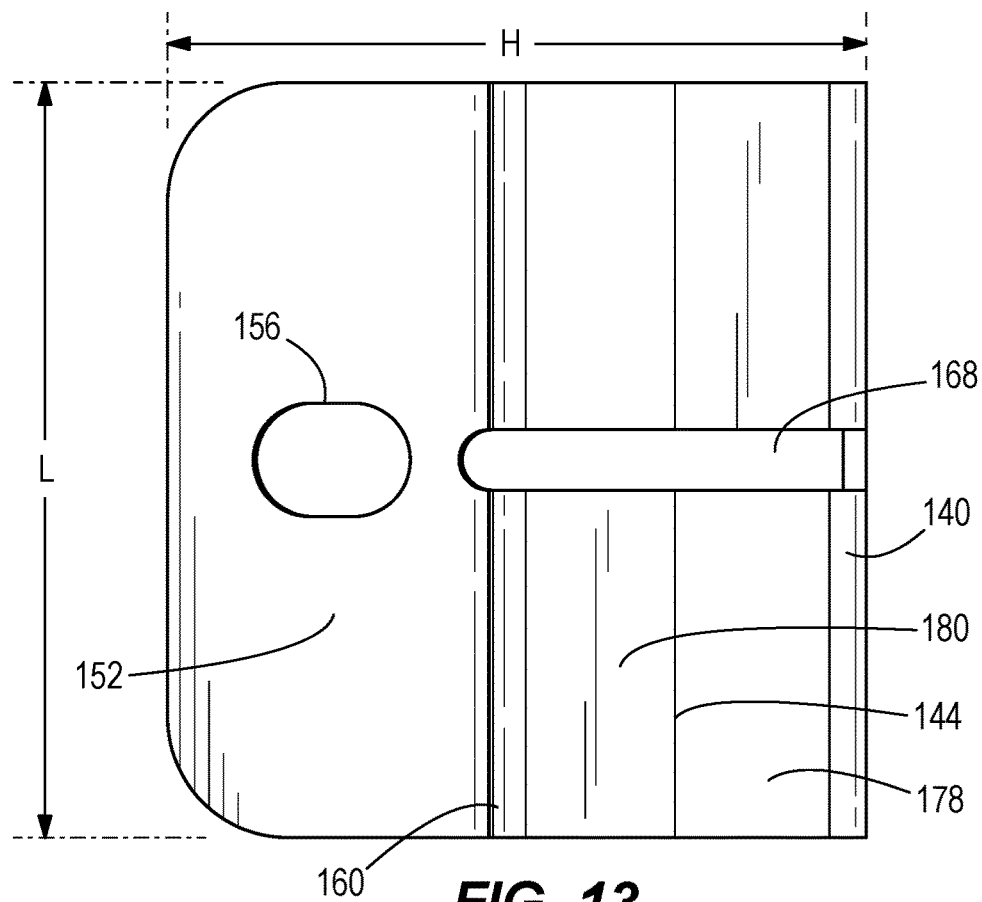
FIG. 13 is a side view of the mounting bracket of FIG. 5.

With reference to FIGS. 11-13, the mounting bracket 128 defines a height H, a width W, and a length L. The height H extends from the first portion 140 to the fourth portion 152. In some embodiments, the height H is greater than 30 mm and less than 60 mm. In some embodiments the height H is greater than 40 mm and less than 50 mm. In some embodiments, the height H is approximately 46 mm. The width W is defined by the first portion 140. In some embodiments, the width W is greater than 15 mm and less than 40 mm. In some embodiments the width W is greater than 20 mm and less than 35 mm. In some embodiments, the width W is approximately 27 mm. The length L is defined by the fourth portion 152. In some embodiments, the length L is greater than 40 mm and less than 60 mm. In some embodiments the length L is greater than 45 mm and less than 55 mm. In some embodiments, the length L is approximately 50 mm.

Figure 14:
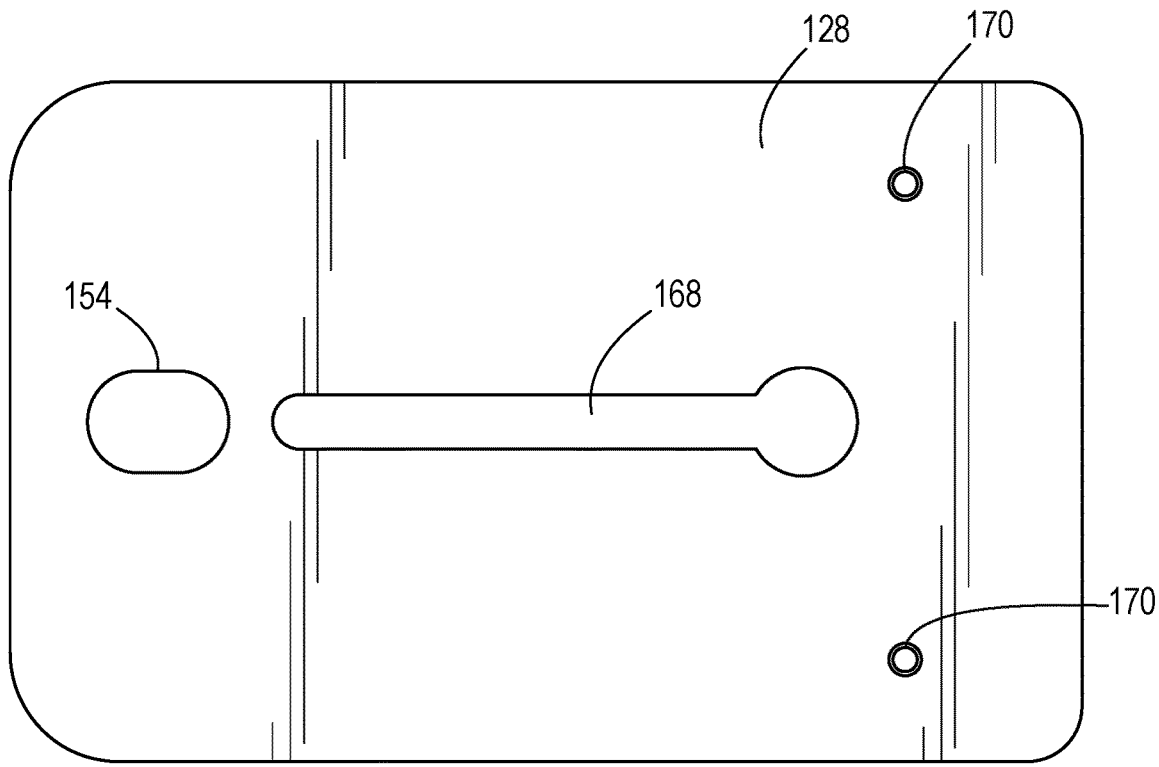
FIG. 14 is a flattened view of the mounting bracket of FIG. 5 before the mounting bracket is bent.

FIG. 14 illustrates the mounting bracket 128 before the mounting bracket 128 is bent. As illustrated, slot 168 is generally rectangular in shape and includes rounded corners. The slot 168 is arranged along a longitudinal axis of the mounting bracket 128. The opening 154 is arranged along the longitudinal axis of the mounting bracket 128.

A method of mounting the camera 132 to the vehicle 110, includes removing the bolt 120 from a first position on the vehicle 110. The camera 132 is coupled to the mounting bracket 128 via the fasteners 136. The fasteners 136 are threaded into the holes 174 of the camera 132 and the holes 170 of the mounting bracket 128 to hold the camera 132 and the mounting bracket 128 together. The cable 137 is routed through the slot 168 of the mounting bracket and is routed into the interior of the vehicle 110. The method also includes aligning the first portion 140 of the mounting bracket 128 with an outer surface 121 of the body panel 112 and aligning the fourth portion 152 of the mounting bracket 128 with the inner surface 122 of the body panel 112. The method further includes aligning the opening 154 with an opening on the inner surface 122 of the body panel 112 where the bolt 120 was screwed into the body panel 112. The bolt 120 is inserted through the opening 154 and into the opening in the body panel 112, and the bolt 120 is returned to the first position on the vehicle 110. The bolt 120 is tightened to secure the mounting bracket 128 and the camera 132 on the vehicle 110. Before the mounting bracket 128 is mounted to the vehicle 110, the vehicle 110 is in a first physical condition. After the mounting bracket is mounted to the vehicle 110, the vehicle 110 is still in the first physical condition. In other words, the method is performed without damaging a body of the vehicle 110 and without taking apart the body of the vehicle 110. Additionally, the method is performed after the vehicle 110 is manufactured If the door is mounted on the vehicle 110, the mounting bracket 128 is inserted through a gap 118 between the door and the body panel 112 before the opening 154 is aligned with the opening in the body panel 112.

Although the method described herein includes specific steps, all of the steps need not be performed or may be performed in another order than presented. In some embodiments, the method may include other steps or may not include all of the steps depicted. Additionally, the steps may be performed in different orders.

A method of removing or demounting the mounted camera 132 from the vehicle 110 includes loosening the bolt 120 from the mounting bracket 128 and the vehicle 110. The bolt 120 is removed from the opening 154, and the body panel 112 and the mounting bracket 128 can be removed from the outer surface 121 and the inner surface 122 of the body panel. The power cable 137 can then be disconnected from the vehicle 110 and removed from the interior of the vehicle 10. The bolt 120 can then be tightened and returned to the first position on the vehicle 110. After the mounted camera 132 is removed, the body of the vehicle 110 is in the same, first physical condition (e.g., no damage or deformation has occurred) as it was before the camera system 124 was mounted to the vehicle 110. The method is performed without damaging the body of the vehicle 110 and without taking apart the body of the vehicle 110.

Figure 15:
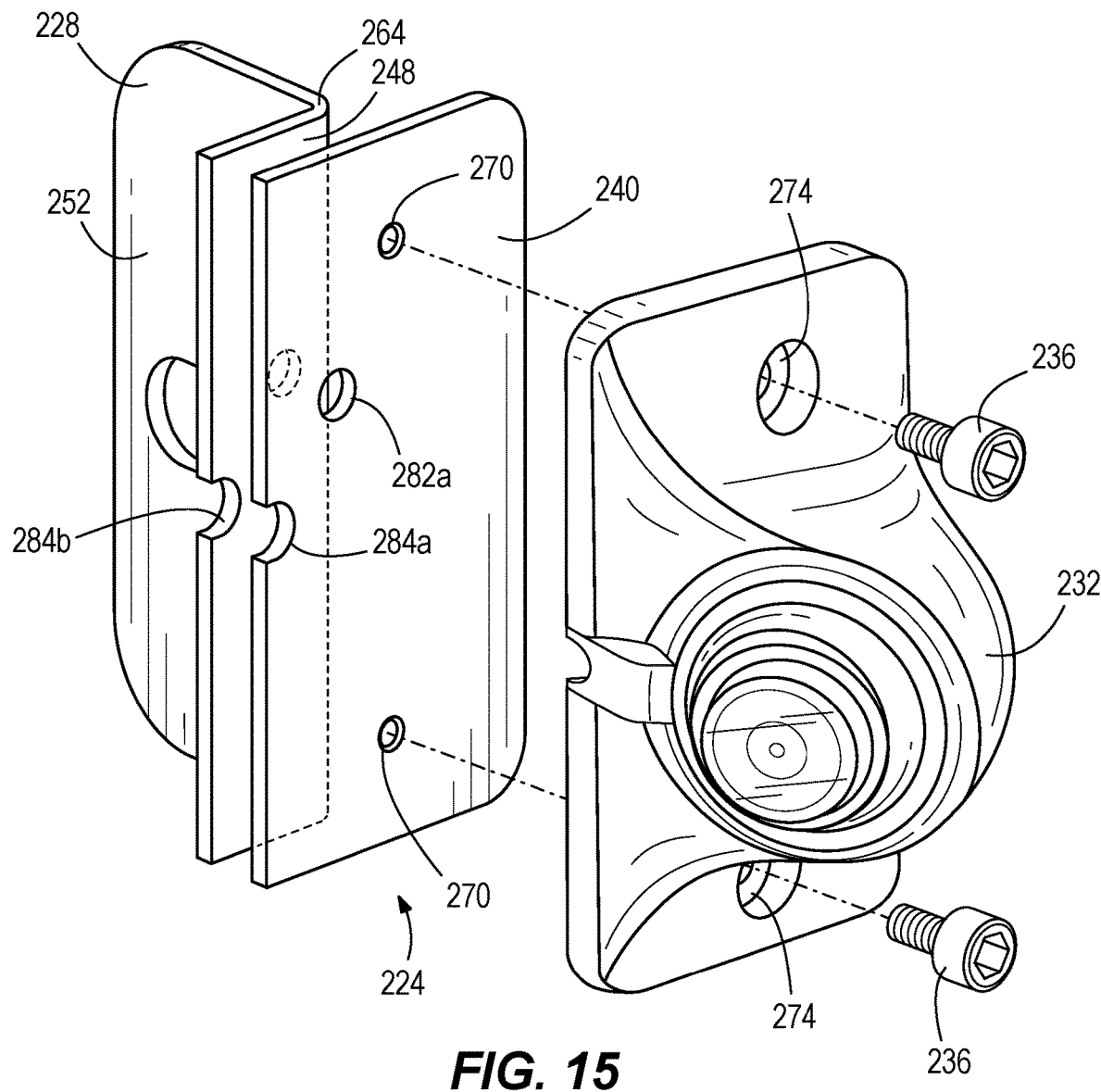
FIG. 15 is an exploded view of a mounting bracket and a sideview camera according to another embodiment.
Figure 16:
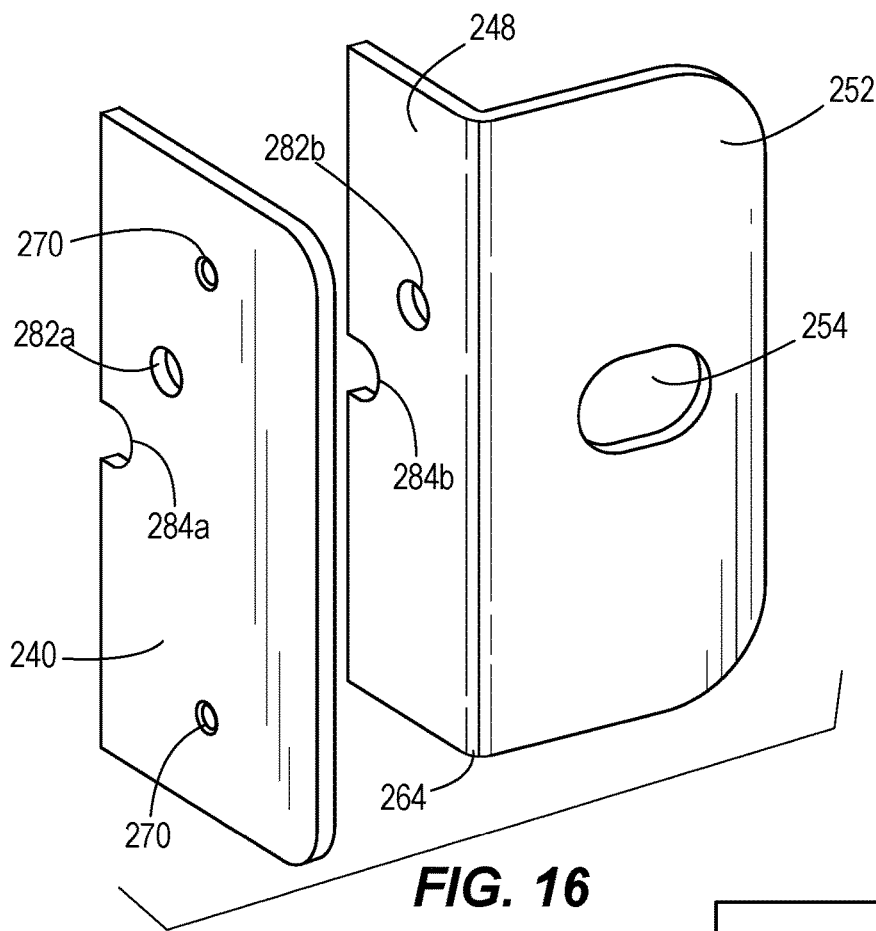
FIG. 16 is a back perspective view of the mounting bracket of FIG. 15.
Figure 17:
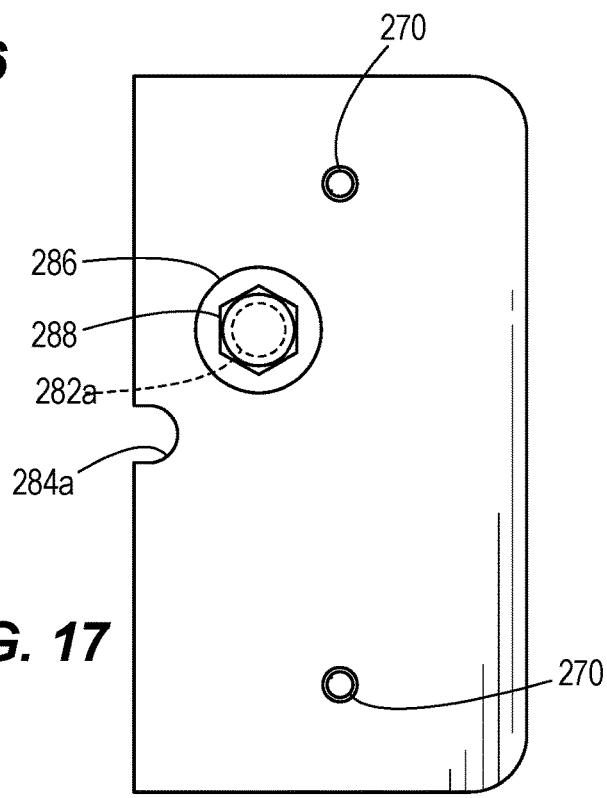
FIG. 17 is a front view of the mounting bracket of FIG. 15.

FIGS. 15-17 illustrate another embodiment of a camera system 224. The camera system 224 has a mounting bracket 228 for a camera 232 and a body panel of a vehicle (not shown). The body panel is substantially the same as the body panel 12 and includes an outer surface and an inner surface. The mounting bracket 228 and the camera 232 are similar to the mounting bracket 28 and the camera 32 of the first embodiment. Unlike the mounting bracket 28, the mounting bracket 228 is formed from a plurality of pieces. More specifically, the mounting bracket is formed from two separate pieces.

As illustrated the mounting bracket 228 has a first section 240 (e.g., a first portion) formed on a first piece, a second section 248 (e.g., a second portion) formed on a second piece, and a third section 252 (e.g., a third portion) adjoining the second section 248 at a first corner 264 on the second piece.

The first section 240 is generally rectangular in shape and is arranged adjacent the outer surface of the body panel. The first section 240 supports the camera 232 adjacent the outer surface of the body panel. The first section 240 includes a plurality of threaded through holes 270. When the camera 232 is mounted to the mounting bracket 228, fasteners 236 are inserted in holes 274 in a housing of the camera 232 and in the holes 270 of the mounting bracket 228. Threads of the fasteners 236 engage threads of the holes 270 to secure the camera 232 to the mounting bracket 228.

The first section 240 may further include at least one through hole 282a (e.g., a first opening). In the illustrated embodiment, the through hole 282a is disposed between the threaded through holes 270, and more specifically, the through hole 282a is disposed between one of the through holes 270 and an arcuate notch 284a (described in detail below). In other embodiments, the first section 240 may include two or more through holes 282a, or the through hole 282a may be centered on the first section 240. The through hole 282a may include an internal threading.

The second section 248 is generally rectangular in shape and is arranged adjacent the inner surface of the body panel. The second section 248 is oriented to face the first section 240. In other words, the second section 248 extends generally along the same direction as the first section 240, and in some instances, may be parallel to the first section 240. In the illustrated embodiment, the second section 248 has a length that is less than the length of the first section 240, however, in other embodiments the second section 248 may have a length that is similar to the length of the first section 240.

The second section 248 may further include at least one through hole 282b (e.g., a second opening). In the illustrated embodiment, the through hole 282b is disposed between the threaded through holes 270, and more specifically, the through hole 282b is disposed between one of the through holes 270 and an arcuate notch 284b (described in detail below). The through hole 282b may include an internal threading.

The through hole 282b is configured to align with the through hole 282a such that a washer 286 and a fastener 288 (e.g., a bolt, a screw, etc.) can extend from the through hole 282a to the through hole 282b. The fastener 288 connects the first section 240 to the second section 248.

The third section 252 extends at a nonzero angle from the second section 248 and converges with the second section 248 at a first corner 264. In some embodiments, the third section 252 extends at about a 90 degree angle from the second section 248. Together the second section 248 and the third section 252 form an L-shape.

The third section 252 is arranged adjacent the inner surface of the body panel. In the illustrated embodiment, the third section 252 is rectangular in shape. The third section 252 has an opening 254 (e.g., a third opening) for receiving a bolt from the vehicle body. In some embodiments, the opening 254 extends to a distal end of the third section 252. The bolt can be inserted into the opening 254 and be tightened against the third section 252 to secure the mounting bracket 228 to the vehicle. When the mounting bracket 228 is coupled to the vehicle, the mounting bracket 228 is arranged such that the bolt extends through the opening 254 and into the inner surface of the body panel.

The first section 240 and the second section 248 may further include the arcuate notches 284a, 284b respectively. The arcuate notches 284a, 284b are shaped to receive the power and data cable of the camera 232. The arcuate notch 284b may extend to the third section 252 and the first corner 264. When the camera 232 is mounted on the mounting bracket 228, the cable is fed through the arcuate notch 284a and the arcuate notch 284b to ensure the cable stays aligned with the mounting bracket 228.

A method of mounting the camera 232 to the vehicle, includes removing the bolt from a first position on the vehicle. The method includes aligning the third section 252 of the mounting bracket 128 with the inner surface of the body panel, and more septically, aligning the opening 254 with an opening on the inner surface of the body panel where the bolt was screwed into the body panel. The bolt is inserted through the opening 254 and into the opening in the body panel and is returned to the first position on the vehicle. The bolt is tightened to secure the second section 248 and the third section 252 to the vehicle. The method further includes drilling a hole through the through hole 282b such that the through hole extends from the inner panel of the vehicle to the outer panel of the vehicle. The first section 240 is then aligned to the through hole in the outer panel of the vehicle such that the first section 240 is aligned with the second section 248 and the through hole 282a is aligned with the through hole 282b. The washer 286 and fastener 288 are then inserted into the through hole 282a and the fastener 288 is tightened to secure the first section 240 to the second section 248 and to the outer panel of the vehicle. The method further includes coupling the camera to the mounting bracket 228 via the fasteners 236. The fasteners 236 are threaded into the holes 274 of the camera 232 and the holes 270 of the mounting bracket 228 to hold the camera 232 and the mounting bracket 228 together. The cable is routed through the first arcuate notch 284a and the second arcuate notch 284b of the mounting bracket 228 and is routed into the interior of the vehicle. The method is performed after the vehicle is manufactured and is performed without taking apart the body of the vehicle 110.

Figure 18:
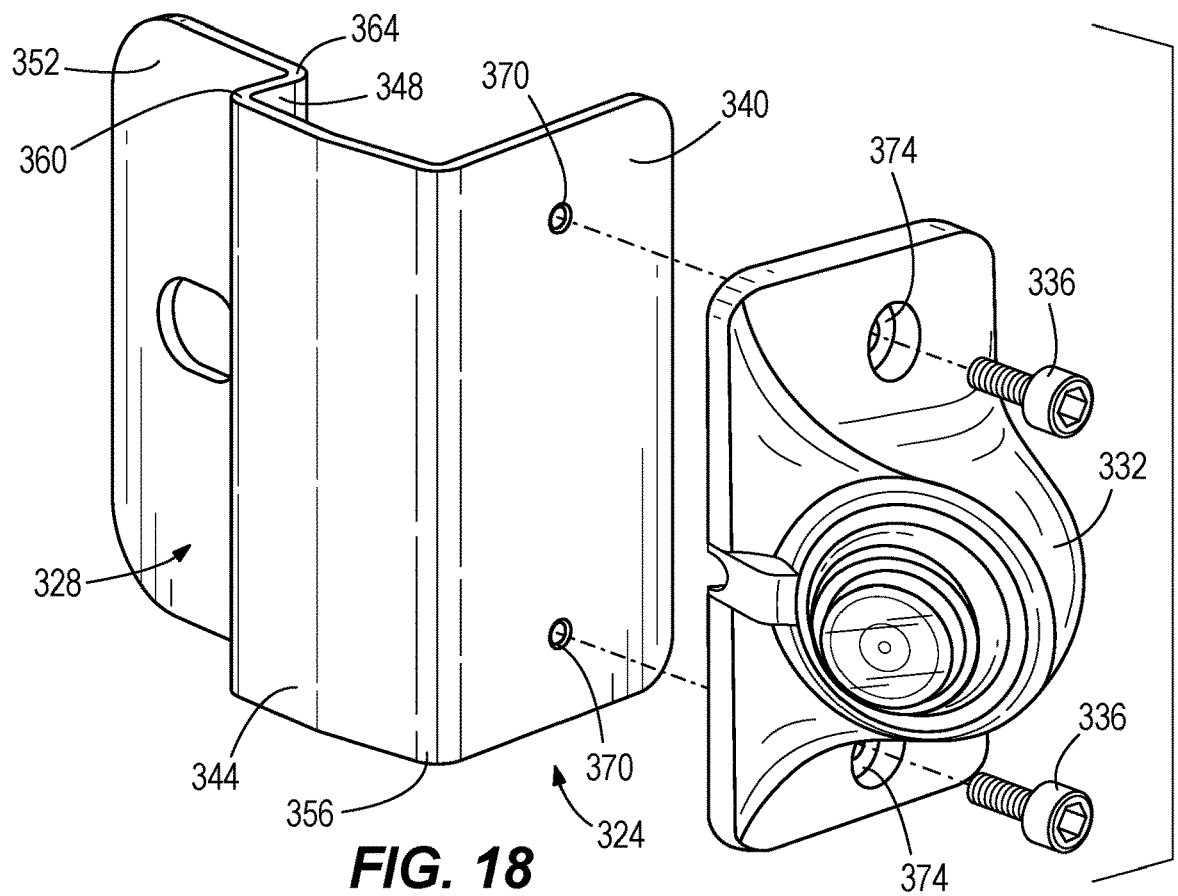
FIG. 18 is an exploded view of a mounting bracket and a sideview camera according to yet another embodiment.
Figure 19:
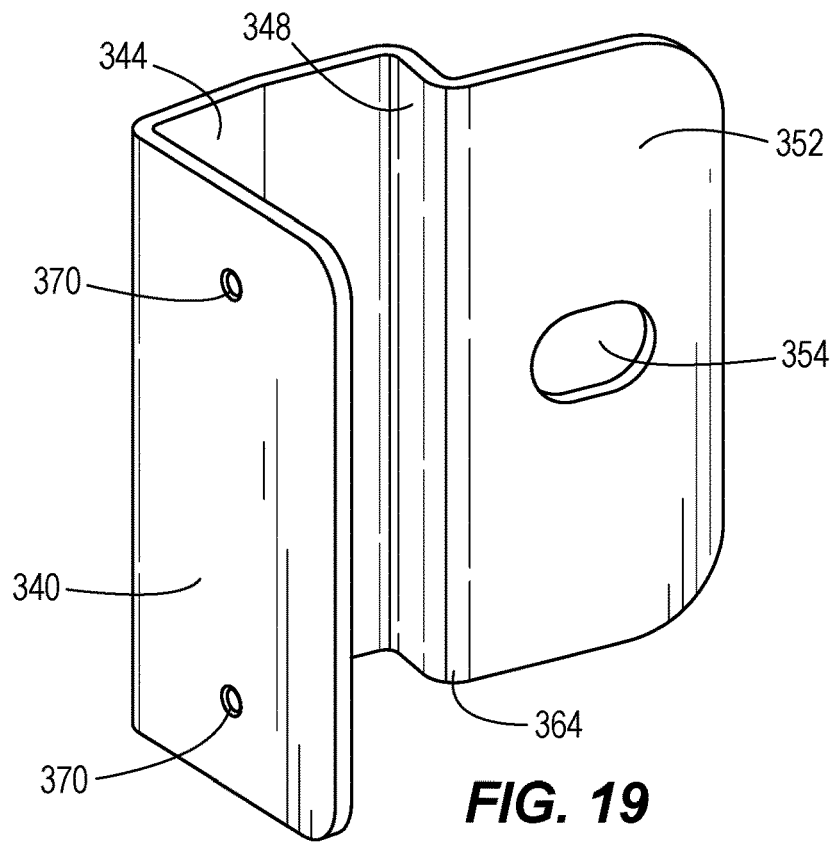
FIG. 19 is a back perspective view of the mounting bracket of FIG. 18.

FIGS. 18-19 illustrate another embodiment of a camera system 324. The camera system 324 has a mounting bracket 328 for a camera 332 and a body panel of a vehicle (not shown). The body panel is substantially the same as the body panel 12 and includes an outer surface and an inner surface. The mounting bracket 328 and the camera 332 are substantially similar to the mounting bracket 28 and the camera 32 of the first embodiment. The mounting bracket 328 is configured to be used with a wireless camera 332. As illustrated the mounting bracket 328 has a first portion 340 adjoining a second portion 344 at a first corner 356, a third portion 348 adjoining the second portion 344 at a second corner 360, and a fourth portion 352 adjoining the third portion 348 at a third corner 364. The first portion 340 may have a length that is greater than a length of the third portion 348. The first portion 340 and the fourth portion 352 may be substantially rectangular in shape.

The first portion 340 includes a plurality of threaded through holes 370. When the camera 332 is mounted to the mounting bracket 328, fasteners 336 are inserted in holes 374 in a housing of the camera 332 and extend into the holes 370 of the mounting bracket 328. Threads of the fasteners 336 engage threads of the holes 370 to secure the camera 332 to the mounting bracket 328.

The fourth portion 352 includes an opening 354 that is configured to receive a bolt of the body panel of the vehicle. The bolt is inserted into the opening 354 and is tightened against the fourth portion 352 to secure the mounting bracket 328 to the vehicle. When the mounting bracket 328 is coupled to the vehicle, the mounting bracket 328 is arranged such that the bolt extends through the opening 354 and into the inner surface of the body panel.

The camera is a wireless camera 332. The wireless camera 332 includes a transmitter and a battery pack that supplies power to the wireless camera 332. The transmitter is operable to transmit data from the camera 332 to a vehicle controller (e.g., a dashboard) inside the vehicle without the use of a power and data cable. The wireless camera 332 may communicate with the vehicle controller using Bluetooth, Wifi, or a radio transmitter. The wireless camera 332 may transmit videos to the vehicle controller and information regarding the status of the wireless camera 332. For example, the wireless camera 332 may send a signal to the vehicle controller when the wireless camera 332 has a low-battery or if the wireless camera 332 is damaged.

In the illustrated embodiment, the wireless camera 332 can be removed from the mounting bracket 328 by loosening the fasteners 336 from the holes 174. Once the wireless camera 332 is removed from the mounting bracket 328, the battery pack of the camera 332 can be replaced. In other embodiments (not shown), the wireless camera 332 can include a sliding lock disposed on the back of the wireless camera 332. The sliding lock opens to the battery pack such that the battery pack of the wireless camera 332 can be replaced without having to remove the camera 332 from the mounting bracket 328. In other embodiments, the wireless camera 332 may be a solar powered such that the user does not need to replace the battery pack of the wireless camera 332.

In all of the embodiments described above and illustrated in the figures, the camera system 24, 124, 224, 324 is illustrated as being mounted to a driver side door 14 with the camera directed toward the outside the vehicle 10 in a direction opposite the direction of travel. It would be obvious to one skilled in the art that the camera system 24, 124, 224, 324 may be mounted in a variety of positions and directions. For example, the camera system 24, 124, 224, 324 may be mounted on the driver side door 14 with the camera directed toward the direction of travel. The camera system 24, 124, 224, 324 may be mounted on the front and/or rear passenger doors. Further, the vehicle 10 may include a plurality of camera systems 24, 124, 224, 324 to allow the driver to have multiple views of the outside the vehicle 10. Additionally, the camera system 24, 124, 224, 324 may be mounted with the camera 32 inside the vehicle 10 such that the driver can view the interior of the vehicle 10.

The embodiments described above and illustrated in the figures are presented by way of example only and are not intended as a limitation upon the concepts and principles of the present invention. As such, it will be appreciated that various changes in the elements and their configuration and arrangement are possible without departing from the spirit and scope of the present invention. Various features and advantages of the invention are set forth in the following claims.

What is claimed is:

1. A system comprising:
    a sideview camera including a power and data cable; and
    a mounting bracket including:
        a first portion coupled to the sideview camera,
        a second portion extending from the first portion at a first nonzero angle,
        a third portion extending from the second portion at a second nonzero angle,
        a fourth portion extending from the third portion at a third nonzero angle and having an opening configured to receive a bolt, and
        a slot extending at least partly through the first portion, the second portion, and the third portion, the slot receiving the power and data cable of the sideview camera.

2. The system of claim 1, wherein together the first portion, the second portion and the third portion form a U-shape.

3. The system of claim 1, wherein the first portion has a length that is greater than a length of the third portion.

4. The system of claim 1, wherein the first portion and the second portion converge to form a corner, and wherein the corner is recessed.

5. The system of claim 1, wherein the mounting bracket is formed from sheet metal and is coated with rubber.

6. The system of claim 1, wherein the sideview camera is mounted to the first portion of the mounting bracket by a threaded fastener, the threaded fasteners extending in a direction perpendicular to the bolt.

7. The system of claim 1, wherein the slot extends continuously through the first portion, the second portion, and the third portion.

8. A mounting bracket configured to mount a sideview camera to a vehicle, the mounting bracket comprising:
    a first portion configured to be coupled to the sideview camera;
    a second portion extending from the first portion at a first nonzero angle and converging with the first portion at a first corner;
    a third portion extending from the second portion at a second nonzero angle and converging with the second portion at a second corner; and
    a fourth portion extending from the third portion at a third nonzero angle and converging with the third portion at a third corner, the fourth portion having an opening configured to receive a fastener.

9. The mounting bracket of claim 8, further comprising a slot extending through the first corner and the second corner, the slot being configured to receive a cable of the sideview camera.

10. The mounting bracket of claim 9, wherein the slot extends continuously between the first corner and the second corner.

11. The mounting bracket of claim 9, wherein the mounting bracket defines a longitudinal axis, and wherein the slot and the opening are arranged on the longitudinal axis.

12. The mounting bracket of claim 8, wherein together the first portion, the second portion, and the third portion form a U-shape.

13. The mounting bracket of claim 12, wherein the fourth portion is perpendicular to the third portion.

14. The mounting bracket of claim 12, wherein third portion has a length that is less than a length of the first portion.

15. The mounting bracket of claim 8, wherein at least one of the first corner and the second corner are recessed.

16. The mounting bracket of claim 15, wherein the mounting bracket is formed from sheet metal and is coated with rubber.

17. The mounting bracket of claim 8, wherein the sideview camera is a wireless camera.

18. A method of mounting a sideview camera to a vehicle, the method comprising:
    providing a mounting bracket, the mounting bracket including a first portion configured to be coupled to the sideview camera, a second portion extending from the first portion at a first nonzero angle and converging with the first portion at a first corner, a slot extending through the first corner, the slot being configured to receive a cable of the sideview camera, and an opening configured to receive a bolt;

removing a bolt from an opening on a body panel of the vehicle;

routing a cable of the camera through the slot extending through the first portion and the second portion of the mounting bracket;

aligning the first portion of the mounting bracket with an outer surface of the body panel;

aligning the second portion of the mounting bracket with an inner surface of the body panel;

inserting the bolt through the opening in the mounting bracket and the opening on the body panel; and tightening the bolt to couple the on the mounting bracket to the vehicle.

19. The method of claim 18, further comprising coupling the sideview camera to the first portion of the mounting bracket by inserting a fastener through a hole in the sideview camera and through a hole in the first portion.

20. The method of claim 18, further comprising sliding the mounting bracket through a gap between the body panel and a door of the vehicle.

21. The method of claim 18, further comprising routing a cable of the camera through a slot of the mounting bracket extending through the first portion, the second portion, and the third portion.

22. The method of claim 21, wherein the routing the cable includes routing the cable from an exterior of the vehicle to an interior of the vehicle.

23. The method of claim 18, wherein mounting the sideview camera to the vehicle does not include causing deformation to the vehicle.

24. The method of claim 18, further comprising mounting the sideview camera to the body panel of the vehicle, the body panel of the vehicle being in a first condition and demounting the sideview camera from the body panel of the vehicle, the body panel of the vehicle still being in the first condition.

25. A mounting bracket configured to mount a sideview camera to a vehicle, the mounting bracket comprising:

a first portion configured to be coupled to the sideview camera, the first portion having a first opening configured to receive a fastener;

a second portion, the second portion having a second opening configured to receive a fastener; and a third portion extending from the second portion at a first nonzero angle and converging with the second portion at a first corner, the third portion having a third opening configured to receive a bolt, wherein the second portion is parallel to the first portion, and wherein the first opening is aligned with the second opening.

* * * * *